US006829582B1

(12) United States Patent
Barsness

(10) Patent No.: US 6,829,582 B1
(45) Date of Patent: Dec. 7, 2004

(54) CONTROLLED ACCESS TO AUDIO SIGNALS BASED ON OBJECTIONABLE AUDIO CONTENT DETECTED VIA SOUND RECOGNITION

(75) Inventor: Eric Lawrence Barsness, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 781 days.

(21) Appl. No.: 09/685,784

(22) Filed: Oct. 10, 2000

(51) Int. Cl.[7] ............................................. G10L 11/00
(52) U.S. Cl. ...................................... 704/275; 709/203
(58) Field of Search ............................... 704/275, 270; 709/203, 206; 725/28

(56) References Cited

U.S. PATENT DOCUMENTS

| | | | |
|---|---|---|---|
| 4,284,846 A | 8/1981 | Marley ........................ 704/253 |
| 4,811,399 A | 3/1989 | Landell et al. .............. 704/253 |
| 5,369,440 A | 11/1994 | Sussman ...................... 725/28 |
| 5,659,793 A | * 8/1997 | Escobar et al. .......... 715/500.1 |
| 5,697,079 A | 12/1997 | Spivey ........................ 455/212 |
| 5,751,335 A | 5/1998 | Shintani |
| 5,828,402 A | * 10/1998 | Collings ...................... 725/28 |
| 5,859,662 A | 1/1999 | Cragun et al. .............. 725/137 |
| 5,870,708 A | 2/1999 | Stewart ....................... 704/275 |
| 5,996,011 A | * 11/1999 | Humes ........................ 709/225 |
| 6,493,744 B1 | * 12/2002 | Emens et al. ................ 709/203 |

FOREIGN PATENT DOCUMENTS

WO    WO 98/21891    5/1998

OTHER PUBLICATIONS

Family Safe Media, *TVGuardian—Frequently Asked Questions*, Website pages, http://www.familysafemedia.com/frequently_asked_questions.html, downloaded Aug. 7, 2000, 9 pages (copyright 1998–2000).
*The Sarnoff Story: Sensory, Sarnoff Collaborate to eliminate background noise in speech recognition for voice control of consumer products*, Press Release for Sarnoff Corporation and Sensory, Inc. (May 1999).
E. Wold et al., "Content–Based Classification, Search, and Retrieval of Audio," IEEE Multimedia, IEEE Computer Society, US, vol. 3, No. 3, 1996, pp. 27–36.

* cited by examiner

*Primary Examiner*—Richemond Dorvil
*Assistant Examiner*—Donald L. Storm
(74) *Attorney, Agent, or Firm*—Wood, Herron & Evans, LLP

(57) ABSTRACT

An apparatus, program product, and method restrict access to objectionable audio content in an audio or audio/video transmission using sound recognition. Sound recognition may be performed, for example, to detect and control access to objectionable non-spoken audio content, e.g., by detecting violent sounds such as screams, explosions, gun shots, sirens, punches, kicks and/or other non-spoken content such as sexually-suggestive sounds. In addition, occurrences of objectionable audio content detected in an audio transmission may be tracked so that access to the audio transmission may be controlled responsive to the identification of multiple occurrences of objectionable audio content. Furthermore, access control over detected objectionable audio content in an audio transmission may result in inhibition of access to a program associated with the audio transmission.

38 Claims, 2 Drawing Sheets

CONTROLLED ACCESS TO AUDIO SIGNALS BASED ON OBJECTIONABLE AUDIO CONTENT DETECTED VIA SOUND RECOGNITION

FIELD OF THE INVENTION

The invention is generally related to audio/video playback and reception, and in particular, to access control of audio/video content, e.g., to control access to objectionable content such as violence, profanity and/or sexually-suggestive material.

BACKGROUND OF THE INVENTION

Limiting access to objectionable content in audio and/or video transmissions is a significant concern, particularly given the increasing availability of creative content via televison, radio and the Internet. Parents in particular are concerned with limiting their children's access to objectionable content such as violent, vulgar or sexually-suggestive subject matter. Parents can have some success in controlling what their kids watch and listen to; however, few parents are able to maintain continuous watch over their children to limit their exposure to inappropriate content. Furthermore, in many instances, parents may not be aware that objectionable content may be present in a particular program until it is too late.

Traditionally, access to creative content has been manually controlled by parents based upon ratings assigned to particular programs by broadcasters or ratings boards. In response to public and governmental pressure, some broadcasters have also indicated the presence of potentially objectionable content by displaying rating information at the beginning of a program. Moreover, some broadcasters embed a rating code within a video signal or within program guide information so that an appropriately-configured receiver such as a television or set top box will automatically restrict access to programs containing inappropriate content. However, such access controls are at their root dependent upon either the broadcasters willingness and accuracy in applying ratings to content or the ability of ratings boards to apply appropriate ratings to programs based upon prevailing standards. As such, if a broadcaster does not choose to participate in providing ratings of particular programs, or if a ratings board applies standards different than would be applied by a parent, children may still be exposed to content that a parent feels is inappropriate despite the assigned rating.

To address these concerns, a significant amount of effort has been directed toward automated devices for controlling access to objectionable content. In the area of television broadcasting, as well as the related fields of video tapes, Digital Versatile Disks (DVD's) and the like, various devices have been proposed for removing inappropriate spoken words from the audio track of a transmission or broadcast. Some devices, for example, monitor a closed captioning data stream to detect inappropriate words such as profane or vulgar words. Other devices utilize speech recognition or audio pattern matching to detect inappropriate spoken words. Such devices limit access to such inappropriate content principally by controlling a mute circuit on a television or otherwise stripping the inappropriate content from the audio signal. Moreover, when a closed captioning stream is utilized as the detection mechanism, the inappropriate textual representation of a spoken word may also be replaced with a more appropriate substitute.

Conventional access control devices, however, suffer from a number of drawbacks. For example, such devices focus on detecting and limiting access to inappropriate language. However, the scope of inappropriate content is greater than simply vulgar language. As much concern has been focused on violent and sexually-suggestive content, neither of which may be reliably detected solely on the basis of spoken words. Further, given that such devices dynamically scan an audio signal, the degree of access control is typically limited to objectionable content as that content is being presented, thereby permitting a viewer to continue to watch an objectionable program once the objectionable audio content is over. Moreover, given that such devices typically only mute an audio signal, when the audio signal forms the sound track of a video broadcast, potentially objectionable video content may still be displayed despite the fact that the inappropriate audio content has been removed.

Therefore, a significant need continues to exist in the art for a manner of automatically controlling access to objectionable audio content.

SUMMARY OF THE INVENTION

The invention addresses these and other problems associated with the prior art by providing in one aspect an apparatus, program product, and method that restrict access to objectionable audio content by performing sound recognition on an audio signal to identify objectionable non-spoken audio content, e.g., by detecting violent sounds such as screams, explosions, gun shots, sirens, punches, kicks, etc., and/or other non-spoken content such as sexually-suggestive sounds. Therefore, in contrast to conventional devices that are only capable of detecting spoken audio content such as vulgar or profane words, access to a wider variety of objectionable content may be controlled.

The invention also addresses other problems associated with the prior art by providing an apparatus, program product and method that restrict access to objectionable audio content by performing sound recognition on an audio signal and tracking occurrences of objectionable audio content in the audio signal so that access to the audio signal may be controlled responsive to the identification of multiple occurrences of objectionable audio content. By tracking the number of occurrences of objectionable content, automated control may be more flexible than is provided by conventional systems wherein control is premised on detection of a single occurrence.

The invention also address additional problems associated with the prior art by providing an apparatus, program product and method that restrict access to objectionable audio content by performing sound recognition on an audio signal and inhibiting access to a program associated with the audio signal responsive to the identification of objectionable audio content.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The discussion hereinafter will focus on a specific implementation of the invention in the field of television reception, e.g., where a combined audio/video signal is received from any of a number of sources such as off-air broadcasts, cable, satellites, video cassette recorders (VCR's), digital versatile disks (DVD's), personal video recorders (PVR's), etc. Consistent with the invention, the audio content of the audio/video signal is processed by a sound and/or voice recognition engine to identify objectionable audio content, e.g., content containing violence, profanity and/or sexually-suggestive material. Access to the audio content is then controlled responsive to such identification, which may incorporate the restriction of access to the audio portion of the audio/video signal and/or the restriction of access to the video portion of the signal as well. However, it will be appreciated by one of ordinary skill in the art having the benefit of the instant disclosure that certain aspects of the invention will have applicability in other applications where audio signals may be communicated and received, and where a potential exists for the reception of objectionable audio content, e.g., Internet applications, audio broadcast applications other than in connection with video, telephony applications, etc. Thus, the invention is not limited to the specific implementations discussed herein.

Figure 1:
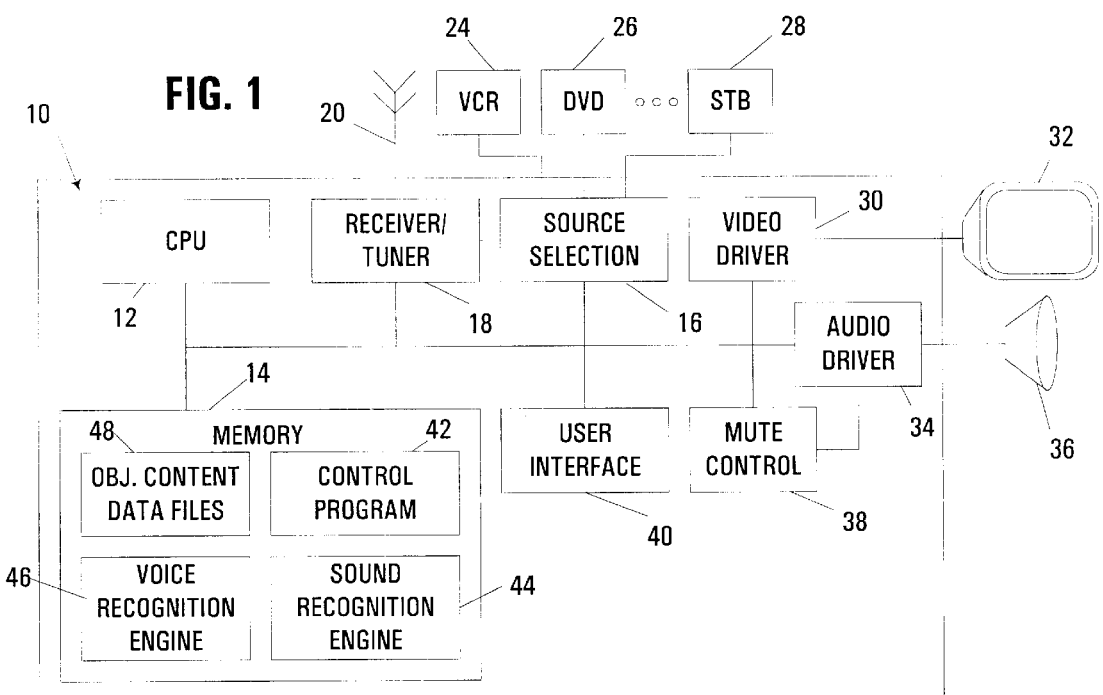
FIG. 1 is a block diagram of a video display system incorporating access control logic consistent with the invention.

Turning now to the Drawings, wherein like numbers denote like parts throughout the several views, FIG. 1 illustrates a specific implementation of the invention in a video display system or apparatus 10, e.g., suitable for use in receiving digital and/or analog encoded television signals as well as decoded audio/video signals from external sources. It will be appreciated, however, that the invention may be implemented in a wide variety of alternate devices, including other electronic devices such as computers, set top boxes, VCR's, PVR's, DVD and other optical disk readers, audio receivers, telephones, answering machines, voice mail systems, etc., each of which may generically be referred to hereinafter as an "apparatus."

Apparatus 10 includes a central processing unit (CPU) 12 interfaced with a memory 14, which, taken in connection with any program code resident in the memory and executed by the CPU, represent at least a portion of the control logic for the apparatus. In other environments, however, hard-wired logic may be used in lieu of a stored program and processor, and thus, the invention is not limited to the particular implementation described herein.

Apparatus 10 may be implemented using practically any type of computer, computer system or other programmable electronic device. The CPU 12 thereof may include one or more processors (e.g., microprocessors or microcontrollers), and the memory may represent volatile or non-volatile solid state memories, magnetic storage media, optical storage media, or combinations of the same, as well as any supplemental levels of memory, e.g., cache memories, backup memories (e.g., programmable or flash memories), read-only memories, etc. In addition, the memory may be considered to include memory storage physically located elsewhere in a digital processing system, e.g., any cache memory in a processor, as well as any storage capacity used as a virtual memory, e.g., as stored on a mass storage device or on another device coupled over a network interconnection.

Apparatus 10 may operate under the control of an operating system, and may execute various computer software applications, components, programs, objects, modules, etc. Moreover, various applications, components, programs, objects, modules, etc. may also execute on one or more processors in another computer or other device coupled to such receiver via networked interconnections, e.g., in a distributed or client-server computing environment, whereby the processing required to implement the functions of a computer program may be allocated to multiple computers over a network. All or some of the control logic may also be implemented in embedded programs, and/or hard-wired logic, e.g., in an ASIC, an FPGA, or other form of programmable device.

In general, the routines executed to implement the embodiments of the invention, whether implemented as part of an operating system or a specific application, component, program, object, module, or sequence of instructions will be referred to herein as "computer programs". The computer programs typically comprise instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links.

As discussed above, apparatus 10 may receive audio/video content from a wide variety of sources, the selection of which is controlled by a source selector 16. For example, over-the-air television signals may be received by a receiver 18 coupled to an antenna 20 or cable service, and capable of receiving and decoding audio/video content into separate video and audio signals. Alternate sources of audio/video content, often externally decoded into separate video and audio signals, may also be received by selector 16, e.g., from a VCR 24, a DVD player 26, a set top box (STB) 28, or other collections of external devices. It will also be appreciated that any audio or video content may be transmitted in either digital or analog form, and moreover, that video and audio content may be routed separately in different environments, e.g., in a home theater environment where audio is ultimately sent to an audio receiver and video is ultimately sent to a display device such as a monitor or projection television.

Video signals are processed and output by a video driver 30 coupled to a video presentation device 32 such as a CRT monitor, an LCD display, a projector, etc. Likewise, audio signals are processed and output by an audio driver 34 coupled to a audio presentation device such as a set of speakers 36. As one mechanism for inhibiting access to objectionable audio content, a mute control circuit 38 may also be provided to mute an audio signal containing objectionable audio content, as will be discussed in greater detail below. Interaction with a user is supported via a user interface 40, which may include front panel buttons on the apparatus and/or a remote control. It will be appreciated that the reception and decoding of analog and/or digital audio and video content in a television or like audio/video processing device, the generation and presentation of a viewable video signal and an audible audio signal on presentation devices, and the interaction with a user are all well understood functions implemented by televisions and like devices, and as such, no further discussion of such functionality or the implementation thereof will be provided herein.

Implementation of access control functionality consistent with the invention is principally provided by a control program 42 that is resident in memory 14 and executed by CPU 12. Control program 42 also typically implements much of the additional functionality of a television as is known in the art.

A sound recognition engine 44, incorporating non-spoken audio content recognition functionality, and a voice recognition engine 46, incorporating voice (spoken) content recognition functionality, are also resident in memory 14. Sound recognition engine 44 specifically detects non-spoken audio content such as explosions, sexually-suggestive sounds, gunfire, screams, sirens, punches, kicks, etc. Voice recognition engine 46, on the other hand, represents a specific type of sound recognition engine that specifically detects objectionable (often profane) spoken words. It will be appreciated that both recognition of non-spoken content and recognition of spoken content fall within the scope of sound recognition in the context of the invention. Thus, in some embodiments, engines 44 and 46 may be implemented in a single sound recognition program. In other embodiments, non-spoken or spoken recognition functionality may be omitted from a sound recognition engine.

Engines 44, 46 typically rely on objectionable content data files 48, representing potentially objectionable audio content that may be found in a received audio signal. Typically, each engine operates by performing real-time pattern matching between an audio signal and the data files to identify objectionable content. For the purposes of voice recognition, the data files may represent textual representations of objectionable words, with voice recognition used to generate a textual stream that is compared with the objectionable words. Otherwise, for sound recognition of non-spoken content (and in some instances, for spoken content as well), audio waveform pattern matching may be used, such that the data files for use in sound recognition will typically include exemplary audio clips of objectionable content. In still other embodiments, objectionable content may be detected based on various characteristics of an audio signal that characterize violent or other objectionable content, e.g., isolated sharp peaks in amplitude that might indicate any of a number of violent acts such as gun shots, punches, etc.

It will be appreciated that audio recognition in the various manners described above is well understood in the art, and that a wide variety of known algorithms may be utilized to perform sound and/or voice recognition to implement the access control functionality described herein. As such, the specifics of audio recognition need not be discussed in any greater detail herein.

Figure 2:
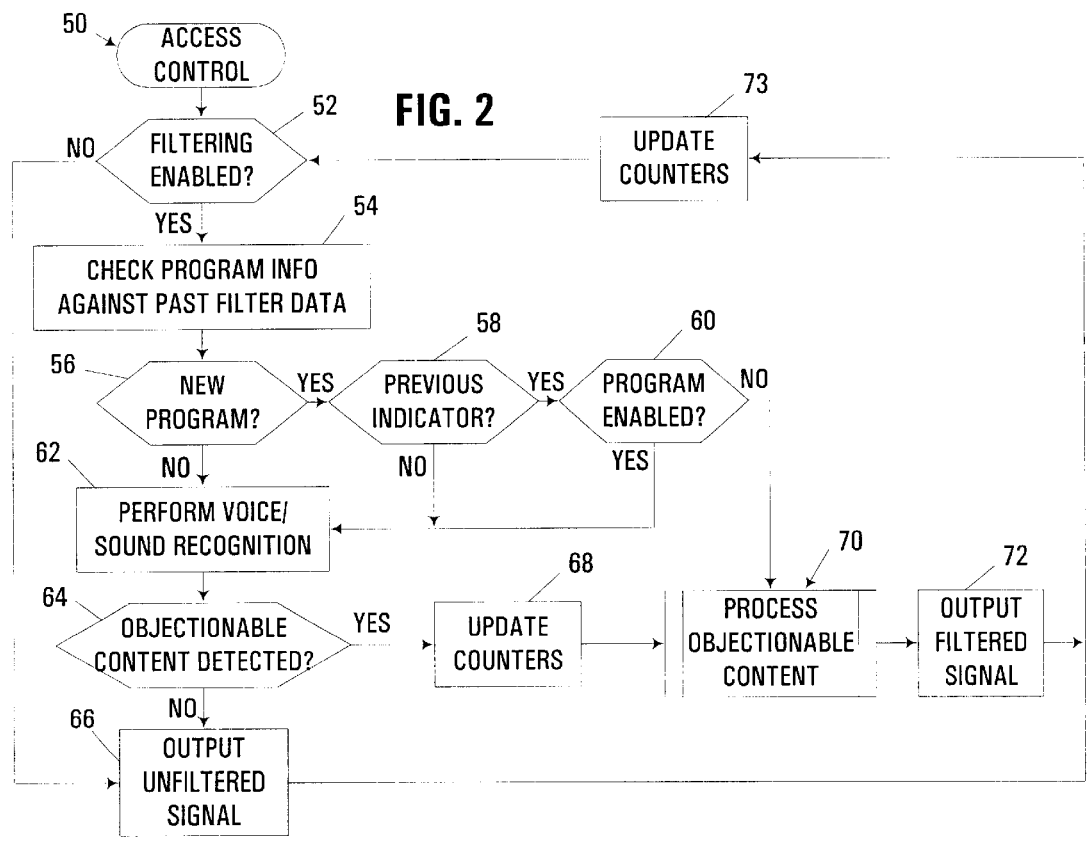
FIG. 2 is a flowchart illustrating the program flow of an access control routine executed by the control program of FIG. 1.
Figure 3:
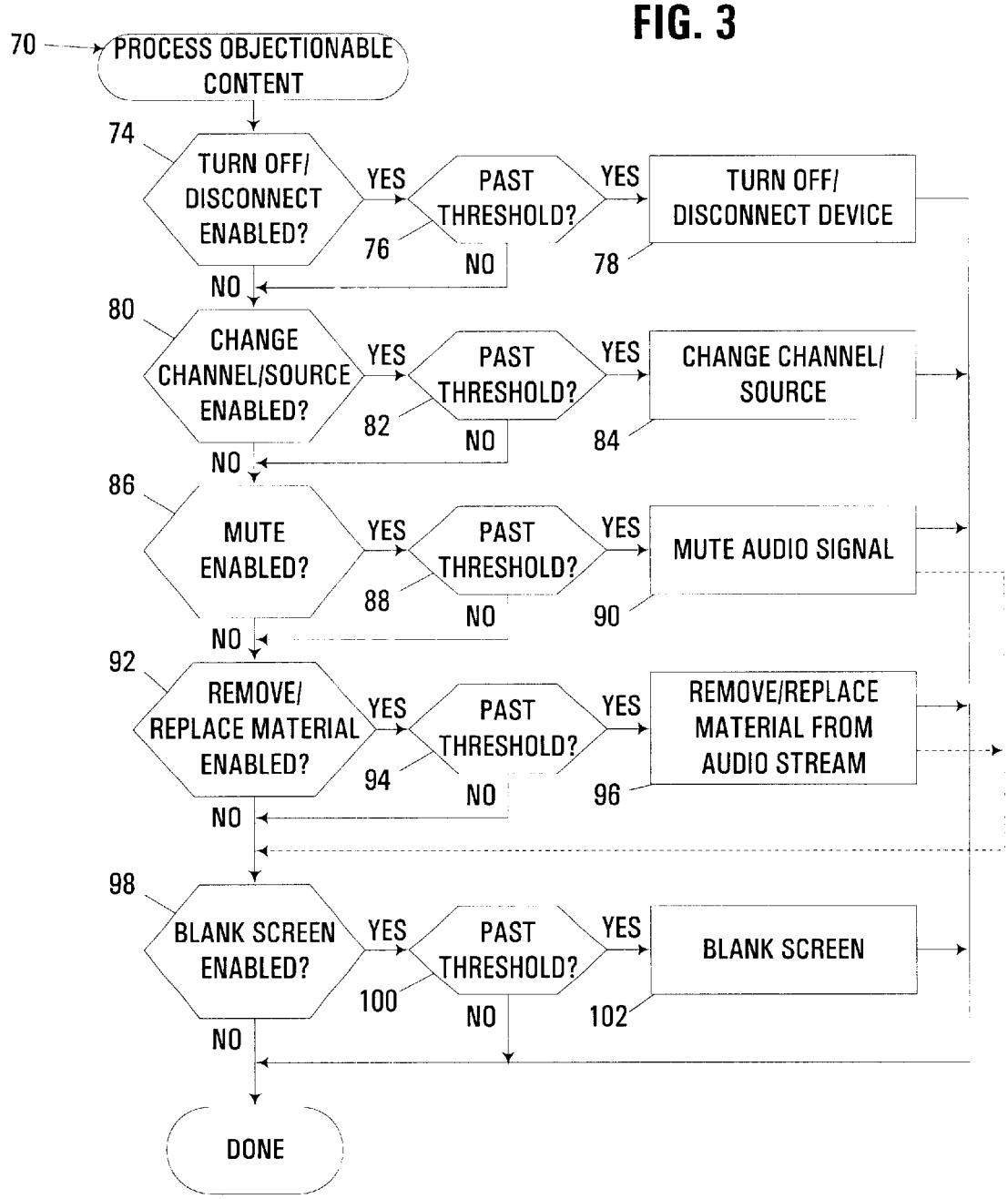
FIG. 3 is a flowchart illustrating the program flow of a process objectionable content routine referenced in FIG. 2.

FIGS. 2 and 3 next illustrate an exemplary implementation of control program 42 of FIG. 1. In this implementation, the tracking of occurrences of objectionable content is implemented through the use of multiple counters utilized for multiple types of objectionable content. For example, different counters may be maintained for different categories of objectionable content, e.g., violent, profane and sexually-suggestive content. Counters may also be provided for different specific types of objectionable content, e.g., gun shots, explosions, screams, etc. Moreover, detection of a particular type of objectionable content may increment multiple counters.

By providing multiple counters, different thresholds may be set for each type of objectionable content to permit various activities to occur based upon exceeding different thresholds. For example, it may be desirable to determine that a program is excessively violent in response to detecting more than ten gun shots or more than three explosions.

It will be appreciated that a single counter may be provided in some implementations. Moreover, in some implementations tracking may not be utilized, whereby the use of counters and tracking of occurrences may not be implemented.

FIG. 2, for example, illustrates an access control routine 50 that operates to control access to objectionable content in apparatus 10 of FIG. 1. Routine 50 operates in an endless loop, and selectively controls access to objectionable content based upon whether filtering is enabled by a user. Routine 50 therefore begins in block 52 by determining whether filtering has been enabled. If so, control passes to block 54 to check current program information against past filter data to determine whether any previous filtering has occurred with regard to the current program being viewed.

In the illustrated embodiment, program information is retrieved from the video signal or another source such as an electronic program guide. Otherwise, programs may be defined based upon predetermined blocks of time, e.g., half hour or one hour blocks, such that program information may be based on a particular channel or source and at a particular time.

Block 56 next determines based upon such program information whether a new program is being displayed—i.e., whether the audio/video broadcast has changed since the last filtering or monitoring pass has occurred in routine 50.

If the current program is a new program, control passes to block 58 to determine whether a previous indicator as to the filtered status of the program exists in the past filtered data, indicating that the current program has already been monitored, based upon the presence of filter data for that particular program. It should be appreciated that a program in this context may refer to a current viewing of a particular program, or may refer to the current viewing or any past viewing of the same program. Moreover, a program may be based upon a particular episode of a series, or may refer to the series itself, whereby different episodes of a series would be considered the same program for the purposes of access control consistent with the invention.

If a previous indicator exists for the current program, control passes to block 60 to determine whether access to the program is enabled. If so, control passes to block 62 to perform voice and/or sound recognition on the audio signal. In addition, returning to blocks 56 and 58, if either the program is determined to not be a new program, or if no previous indicator exists for the program in the filter data, control passes directly to block 62 to initiate voice and/or sound recognition.

Block 62 monitors the audio signal (or the audio portion of a video signal) to detect any objectionable content. As discussed above, such detection may be based upon pattern matching of spoken and/or non-spoken audio content, as well as detection of objectionable textual content generated in response to voice recognition performed on an audio signal. Block 62 may perform recognition on a specific time slice of a broadcast, or may be implemented on a separate thread and operate continuously and in parallel with the program tracking functionality of access control routine 50. In general, the allocation of the functionality described in connection with routine 50 among various threads or tasks may vary in different embodiments.

After voice and/or sound recognition has been performed, control passes to block 64 to determine whether any objectionable content was detected. The types of objectionable content that may be detected and controlled via the illustrated implementation include, for example, violent sounds such as screams, explosions, gun shots, sirens, punches, kicks, etc., as well as profane words, vulgar words, sexually-suggestive words, morally or religiously objectionable words, and sexually-suggestive sounds, e.g., moans.

If no objectionable content is detected, control passes to block 66 to output an unfiltered audio signal (or alternatively, do nothing). If, however, objectionable content is detected, block 64 passes control to block 68 to update the appropriate counter(s) based upon the type of objectionable content that is detected. A process objectionable content routine 70 is then called to perform one or more access control operations based upon the status of the update counters subsequent to detection of the current objectionable content. Upon completion of routine 70, control then passes to block 72 to output a filtered audio signal as appropriate. As will become apparent below in connection with FIG. 3, block 72 may be omitted or bypassed in certain circumstances, e.g., should the source or channel be changed in response to detection of the objectionable content.

Upon completion of either of blocks 66 and 72, control next passes to block 73 to optionally update the past filter data for the program, e.g., to indicate that the program is or is not enabled. In block 73, additional functionality such as management of a filter data structure may also be performed, e.g., to remove stale entries and/or update indicators to selectively enable or disable programs in response to new data. Upon completion of block 73, control returns to block 52 to perform another monitoring or detection pass of routine 50. Moreover, returning to block 52, if filtering is disabled, control passes directly to block 66, bypassing the aforementioned filtering functionality.

FIG. 3 illustrates process objectionable content routine 70 in greater detail. Routine 70 basically operates by determining what operations, if any, should be performed to control access to objectionable content. For the purposes of routine 70, it is assumed that the user has the ability to selectively enable or disable certain activities to perform custom access control. In the illustrated embodiment, the permissible access control operations are shutting off the presentation device that presents a program to a user, inhibiting access to a channel or source, muting an audio signal, removing or replacing material and blanking a video screen. It will be appreciated that various combinations of these access control operations may be performed. Moreover, additional actions may be supported in other embodiments.

Routine 70 begins in block 74 by determining whether a turn off/disconnect action has been enabled. If so, control passes to block 76 to determine whether an appropriate counter is past a predetermined threshold. In this context, it may be seen that various thresholds may be set to permit different activities to occur in response to different numbers of occurrences in one or more counters. For example, it may be desirable to simply mute an audio signal in response to a relatively low number of occurrences of objectionable content, but to inhibit access to a program, channel, source, or even completely shut off a device in response to relatively higher numbers of occurrences. Thresholds may also vary based on content type, e.g., so that 100 gun shots might trigger a program change, while only 10 explosions may be needed to trigger the same action.

If the threshold associated with the turn off/disconnect action is exceeded, block 76 passes control to block 78 to turn off or disconnect the current device. For example, for a television or set top box, power to the device may simply be turned off, permitting no future viewing with the device until the completion of a program. For other devices, e.g., Internet access devices, a similar power down may be performed, or access to the Internet may be restricted.

If either the turn off/disconnect action is disabled, or the threshold has not been exceeded, blocks 74 and 76 pass control to block 80 to determine whether a change channel/source action is enabled. If so, control passes to block 82 to determine whether the threshold associated with such an action has been exceeded. If so, control passes to block 84 to change the channel and/or source to inhibit access to the current program. For a television broadcast, for example, changing the channel may consist of selecting a next or previous channel in a channel lineup. Otherwise, changing a source may consist of selecting another video source such as a VCR, a DVD, another set top box, or an over the air receiver.

If either the change channel/source action is disabled, or the threshold is not exceeded, blocks 80 and 82 pass control to block 86 to determine whether an audio mute action has been enabled. If so, control passes to block 88 to determine whether the threshold associated with this action has been exceeded. If so, the audio signal is muted in block 90 to restrict access to the objectionable content. Such muting may be performed solely for the objectionable content, or may be set for the remainder of a program.

If either the mute action is not enabled, or the threshold is not exceeded, blocks 86 and 88 pass control to block 92 to determine whether a remove/replace material action has been enabled. If so, control passes to block 94 to determine whether the threshold associated with the action has been exceeded. If so, the objectionable material is removed or replaced in the audio stream in block 96. Removal of material may consist of stripping the objectionable material from the audio stream, e.g., in a manner similar to devices that remove vocals from sound recordings. Replacing material may consist of playing an alternate sound clip, e.g., providing an alternate sound or spoken word that retains the context of the content in a non-objectionable manner.

If either the remove/replace material action is not enabled, or the threshold has not been exceeded, blocks 92 and 94 pass control to block 98 to determine whether a blank screen action is enabled. If so, control passes to block 100 to determine whether the threshold associated with such action has been exceeded. If so, the display screen is blanked in block 102 to inhibit access to the video portion of an audio/video broadcast. As represented by the dashed lines from blocks 90 and 96, it may also be desirable to permit muting and/or removal/replacement of the audio content to be performed concurrently with blanking the screen.

Moreover, screen blanking may be enabled for the remainder of a program, or may be limited solely to sections of a program within which objectionable content has been detected. For example, in response to the detection of gunfire, it may be desirable to blank the screen during such sections, or within a predetermined time frame such as a few minutes.

If either the blank screen action is not enabled or the threshold associated therewith has not been exceed, blocks 98 and 100 terminate routine 70. Moreover, upon completion of any of blocks 78, 84, 90, 96 and 102, routine 70 is complete.

It will be appreciated that any number of appropriate user interfaces may be utilized to configure apparatus 10 to selectively enable or disable the presentation of objectionable content to a viewer. A user may have the ability to select the types of content that are controlled, e.g., based upon type of content such as violent, profane or sexually-suggestive, or with greater granularity within each type, e.g., gun shots, hits or punches, screams, explosions, etc. A user may also be permitted to select specific words to be found objectionable.

In addition, it may be desirable to permit a user to control the types of access operations that are performed, as well as the thresholds that may trigger such operations.

In the illustrated embodiment, non-spoken objectionable content is determined via sound files stored for the control program by a manufacturer. In other embodiments, however, users may provide sound clips of objectionable content as well, e.g., downloadable over the Internet.

Setting of such configuration may performed through any known user interface appropriate for the particular type of device providing access control (e.g., GUI interfaces). Moreover, it may be desirable to provide password protection or other authentication controls to permit only authorized users to configure the apparatus.

Various additional modifications may be made to the illustrated embodiments without departing from the spirit and scope of the invention. For example, rather than operating in real time, the access control may be utilized on pre-recorded content, e.g., by playing back a video tape, DVD or other stored signal, and storing access control information either on the medium within which the content is stored or within another data structure, e.g., within the apparatus, so that future playback may be controlled based upon pre-stored access control information. Access control may also be performed on purely audio signals, e.g., provided via radio broadcasts or the Internet. Other combined audio/video signals may also be access controlled, e.g., provided via optical disks, video tapes, mass storage devices, off-air broadcasts, cable broadcasts, satellite broadcasts, computer networks, the Internet, etc. Further, content control may be implemented in telephones or headsets, e.g., to limit access to objectionable content present on such media.

Moreover, tracking the number of occurrences of objectionable audio content may be based upon the total number of occurrences, or may be based upon frequency, e.g., the number of occurrences within a period of time. Moreover, as discussed above, inhibiting access to objectionable content may be based on simply the portion of a broadcast that contains such objectionable content, or may be based on a program-by-program basis so that when a sufficient amount of objectionable content is detected, future access to a particular program containing such content is inhibited. As such, should a user be locked out of a program, future attempts to access that program after other programs are viewed (even if no additional objectionable content has been found) may still be prevented.

In addition, occurrence tracking information may be displayed to a user, e.g., to display the amount and type of objectionable content present in a program. Further, a rating may be assigned to a program and displayed to a user based on the tracking information.

Also, as mentioned above, inhibition of access to objectionable content may be based on inhibiting access just to the objectionable content as it occurs, or may be based on inhibiting access to the remainder of a program, or to an entire program, based on the presence of such content in a current or past viewing of a program.

Other modifications will be apparent to one of ordinary skill in the art. Therefore, the invention lies in the claims hereinafter appended.

What is claimed is:

1. A method of restricting access to objectionable audio content, the method comprising:

(a) performing sound recognition on an audio signal to identify objectionable non-spoken audio content therein; and (b) controlling access to the audio signal responsive to the identification of objectionable non-spoken audio content in the audio signal, wherein performing sound recognition on the audio signal comprises detecting at least one of a violent sound and a sexually-suggestive sound in the audio signal.

2. The method of claim 1, wherein the violent sound is selected from the group consisting of a scream, an explosion, a gun shot, a siren, a punch, a kick, and combinations thereof.

3. The method of claim 1, wherein the audio signal comprises a sound track to a video signal.

4. The method of claim 3, further comprising receiving the video signal from a video source selected from the group consisting of an optical disk, a video tape, a mass storage device, an off-air broadcast, a cable broadcast, a satellite broadcast, a computer network, the Internet, and combinations thereof.

5. The method of claim 3, wherein performing sound recognition on the audio signal is performed at a different time from presentation of the audio signal to a user.

6. The method of claim 3, wherein performing sound recognition on the audio signal is performed concurrently with presentation of a video signal to a user.

7. The method of claim 1, wherein controlling access to the audio signal comprises performing an access inhibiting operation selected from the group consisting of muting the audio signal, selecting an alternate channel to a channel associated with the audio signal, inhibiting access to the channel associated with the audio signal, inhibiting access to a program associated with the audio signal, shutting off a presentation device that presents the audio signal to a user, and combinations thereof.

8. An apparatus, comprising:

(a) a memory; and (b) a program resident in the memory and configured to perform sound recognition on an audio signal to identify objectionable non-spoken audio content therein, and to control access to the audio signal responsive to the identification of objectionable non-spoken audio content in the audio signal, wherein the objectionable non-spoken audio content includes at least one of a violent sound and a sexually-suggestive sound.

9. The apparatus of claim 8, wherein the program is configured to perform sound recognition on the audio signal by detecting the violent sound in the audio signal, the violent sound selected from the group consisting of a scream, an explosion, a gun shot, a siren, a punch, a kick, and combinations thereof.

10. The apparatus of clam 8, wherein the program is configured to perform sound recognition on the audio signal by detecting the sexually-suggestive sound in the audio signal.

11. The apparatus of claim 8, wherein the program is configured to control access to the audio signal by performing an access inhibiting operation selected from the group consisting of muting the audio signal, selecting an alternate channel to a channel associated with the audio signal, inhibiting access to the channel associated with the audio signal, inhibiting access to a program associated with the audio signal, shutting off a presentation device that presents the audio signal to a user, and combinations thereof.

12. The apparatus of claim 8, wherein the apparatus is selected from the group consisting of a television, a video cassette recorder, a set top box, a satellite receiver, a cable box, an optical disk reader, and an Internet access set top box.

13. A program product, comprising:
   (a) a program configured to perform sound recognition on an audio signal to identify objectionable non-spoken audio content therein, and to control access to the audio signal responsive to the identification of objectionable non-spoken audio content in the audio signal, wherein the objectionable non-spoken audio content includes at least one of a violent sound and a sexually-suggestive sound; and
   (b) a computer-readable signal bearing medium bearing the program.

14. The program product of claim 13, wherein the computer-readable signal bearing medium includes at least one of a recordable medium and a transmission medium.

15. A method of restricting access to objectionable audio content, the method comprising:
   (a) performing sound recognition on an audio signal to identify objectionable audio content therein;
   (b) tracking occurrences of objectionable audio content in the audio signal, wherein tracking the occurrences of objectionable audio content includes tracking a frequency of occurrences of objectionable audio content, relative to time, and wherein controlling access to the audio signal includes inhibiting access to the audio signal in response to the frequency of occurrences of objectionable audio content exceeding a predetermined threshold; and
   (c) controlling access to the audio signal responsive to the identification of multiple occurrences of objectionable audio content in the audio signal.

16. The method of claim 15, wherein tracking the occurrences of objectionable audio content includes tracking a total number of occurrences of objectionable audio content, and wherein controlling access to the audio signal includes inhibiting access to the audio signal in response to the total number of occurrences of objectionable audio content exceeding a predetermined threshold.

17. The method of claim 15, wherein controlling access to the audio signal comprises performing an access inhibiting operation selected from the group consisting of muting the audio signal, selecting an alternate channel to a channel associated with the audio signal, inhibiting access to the channel associated with the audio signal, inhibiting access to a program associated with the audio signal, shutting off a presentation device that presents the audio signal to a user, and combinations thereof.

18. The method of claim 15, further comprising assigning a rating to at least one of a program, a channel and a content source associated with the audio signal responsive to the tracked occurrences of objectionable audio content.

19. The method of claim 15, wherein performing sound recognition on the audio signal to identify objectionable audio content therein comprises performing sound recognition on the audio signal to identify objectionable non-spoken audio content therein, the objectionable non-spoken audio content including at least one of violent and sexually-suggestive content.

20. The method of claim 15, wherein performing sound recognition on the audio signal to identify objectionable audio content therein comprises performing voice recognition on the audio signal to identify objectionable spoken audio content therein.

21. An apparatus, comprising:
   (a) a memory; and
   (b) a program resident in the memory and configured to perform sound recognition on an audio signal to identify objectionable audio content therein, track occurrences of objectionable audio content in the audio signal, and control access to the audio signal responsive to the identification of multiple occurrences of objectionable audio content in the audio signal, wherein the program is configured to tack the occurrences of objectionable audio content by tracking a frequency of occurrences of objectionable audio content relative to time, and wherein the program is configured to control access to the audio signal by inhibiting access to the audio signal in response to the frequency of occurrences of objectionable audio content exceeding a predetermined threshold.

22. The apparatus of claim 21, wherein the program is configured to track the occurrences of objectionable audio content by tracking a total number of occurrences of objectionable audio content, and wherein the program is configured to control access to the audio signal by inhibiting access to the audio signal in response to the total number of occurrences of objectionable audio content exceeding a predetermined threshold.

23. The apparatus of claim 21, wherein the program is configured to control access to the audio signal by performing an access inhibiting operation selected from the group consisting of muting the audio signal, selecting an alternate channel to a channel associated with the audio signal, inhibiting access to the channel associated with the audio signal, inhibiting access to a program associated with the audio signal, shutting off a presentation device that presents the audio signal to a user, and combinations thereof.

24. The apparatus of claim 21, wherein the program is further configured to assign a rating to at least one of a program, a channel and a content source associated with the audio signal responsive to the tracked occurrences of objectionable audio content.

25. The apparatus of claim 21, wherein the program is configured to perform sound recognition on the audio signal by performing sound recognition on the audio signal to identify objectionable non-spoken audio content therein, the objectionable non-spoken audio content including at least one of violent and sexually-suggestive content.

26. A program product, comprising:
   (a) a program configured to perform sound recognition on an audio signal to identify objectionable audio content therein, track occurrences of objectionable audio content in the audio signal, and control access to the audio signal responsive to the identification of multiple occurrences of objectionable audio content in the audio signal, wherein the program is configured to track the occurrences of objectionable audio content by tracking a frequency of occurrences of objectionable audio content relative to time, and wherein the program is configured to control access to the audio signal by inhibiting access to the audio signal in response to the frequency of occurrences of objectionable audio content exceeding a predetermined threshold; and (b) a computer-readable signal bearing medium bearing the program.

27. A method of restricting access to objectionable audio content, the method comprising:

(a) performing sound recognition on an audio signal to identify objectionable audio content therein, wherein performing sound recognition on the audio signal to identify objectionable audio content therein comprises performing sound recognition on the audio signal to identify objectionable non-spoken audio content therein, the objectionable non-spoken audio content including at least one of violent and sexually-suggestive content; and (b) inhibiting access to a program associated with the audio signal responsive to the identification of objectionable audio content in the audio signal.

28. The method of claim 27, wherein inhibiting access to the program comprises shutting off a presentation device that presents the audio signal to a user.

29. The method of claim 27, wherein inhibiting access to the program comprises inhibiting access to a channel associated with the program.

30. The method of claim 29, wherein inhibiting access to the channel includes inhibiting access to the channel until completion of the program.

31. The method of claim 27, wherein performing sound recognition on the audio signal to identify objectionable audio content therein comprises performing voice recognition on the audio signal to identify objectionable spoken audio content therein.

32. The method of claim 27, further comprising tracking occurrences of objectionable audio content in the audio signal, wherein inhibiting access to the audio signal is responsive to the identification of multiple occurrences of objectionable audio content in the audio signal.

33. An apparatus, comprising:

(a) a memory; and (b) a program resident in the memory and configured to perform sound recognition on an audio signal to identify objectionable audio content therein and inhibit access to a program associated with the audio signal responsive to the identification of objectionable audio content in the audio signal, wherein the objectionable audio content includes at least one of a violent sound and a sexually-suggestive sound.

34. The apparatus of claim 33, wherein the program is configured to inhibit access to the program by shutting off a presentation device that presents the audio signal to a user.

35. The apparatus of claim 33, wherein the program is configured to inhibit access to the program by inhibiting access to a channel associated with the program.

36. The apparatus of claim 35, wherein the program is configured to inhibit access to the channel by inhibiting access to the channel until completion of the program.

37. The apparatus of claim 33, wherein the program is further configured to track occurrences of objectionable audio content in the audio signal, and wherein the program is configured to inhibit access to the audio signal responsive to the identification of multiple occurrences of objectionable audio content in the audio signal.

38. A program product, comprising:

(a) a program configured to perform sound recognition on an audio signal to identify objectionable audio content therein and inhibit access to a program associated with the audio signal responsive to the identification of objectionable audio content in the audio signal, wherein the objectionable audio content includes at least one of a violent sound and a sexually-suggestive sound; and (b) a computer-readable signal bearing medium bearing the program configured to perform sound recognition and inhibit access.

* * * * *